(12) United States Patent
Bai et al.

(10) Patent No.: US 11,560,192 B2
(45) Date of Patent: Jan. 24, 2023

(54) STAIR CLIMBING GAIT PLANNING METHOD AND APPARATUS AND ROBOT USING THE SAME

(71) Applicant: UBTECH ROBOTICS CORP LTD, Shenzhen (CN)

(72) Inventors: Jie Bai, Shenzhen (CN); Ligang Ge, Shenzhen (CN); Hongge Wang, Shenzhen (CN); Yizhang Liu, Shenzhen (CN); Shuping Hu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 352 days.

(21) Appl. No.: 16/885,227

(22) Filed: May 27, 2020

(65) Prior Publication Data
US 2021/0331753 A1 Oct. 28, 2021

(30) Foreign Application Priority Data
Apr. 24, 2020 (CN) .......................... 202010330979.4

(51) Int. Cl.
*B62D 57/02* (2006.01)
*G05D 1/08* (2006.01)
*B25J 9/16* (2006.01)
*G06F 17/18* (2006.01)
*B25J 19/02* (2006.01)

(52) U.S. Cl.
CPC ............ *B62D 57/02* (2013.01); *B25J 9/1669* (2013.01); *B25J 9/1697* (2013.01); *B25J 19/023* (2013.01); *G05D 1/0891* (2013.01); *G06F 17/18* (2013.01)

(58) Field of Classification Search
None
See application file for complete search history.

(56) References Cited

U.S. PATENT DOCUMENTS

| 2011/0004341 A1* | 1/2011 | Sarvadevabhatla .... B25J 9/1602 700/250 |
| 2012/0155775 A1* | 6/2012 | Ahn .......................... G06T 7/73 701/527 |

(Continued)

FOREIGN PATENT DOCUMENTS

CN 105666498 B * 7/2017

OTHER PUBLICATIONS

Kaiser, ASIMO Walking sideways, forwards & backwards, balancing YouTube video: https://www.youtube.com/watch?v=QHOP-TFR38w (Year: 2012).*

*Primary Examiner* — Jeff A Burke
*Assistant Examiner* — Arslan Azhar

(57) ABSTRACT

The present disclosure provides a stair climbing gait planning method and an apparatus and a robot using the same. The method includes: obtaining first visual measurement data through a visual sensor of the robot; converting the first visual measurement data to second visual measurement data; and performing a staged gait planning on a process of the robot to climb the staircase based on the second visual measurement data. Through the method, the visual measurement data is used as a reference to perform the staged gait planning on the process of the robot to climb the staircase, which greatly improves the adaptability of the robot in the complex scene of stair climbing.

20 Claims, 13 Drawing Sheets

(56) References Cited

U.S. PATENT DOCUMENTS

| | | | | |
|---|---|---|---|---|
| 2013/0116820 A1* | 5/2013 | Lee | ...................... | G05D 1/0891 |
| | | | | 700/254 |
| 2018/0281881 A1* | 10/2018 | Komuro | .................. | G06T 7/246 |
| 2020/0324412 A1* | 10/2020 | Whitman | ............. | G05D 1/0246 |

* cited by examiner

STAIR CLIMBING GAIT PLANNING METHOD AND APPARATUS AND ROBOT USING THE SAME

CROSS REFERENCE TO RELATED APPLICATIONS

The present disclosure claims priority to Chinese Patent Application No. 202010330979.4, filed Apr. 24, 2020, which is hereby incorporated by reference herein as if set forth in its entirety.

BACKGROUND

1. Technical Field

The present disclosure relates to robot technology, and particularly to a stair climbing gait planning method and an apparatus and a robot using the same.

2. Description of Related Art

When controlling a humanoid robot to climb a staircase, one of the key issues is how to reasonably conduct navigation and gait planning. However, in the prior art, the gait planning is usually aimed at the scene of walking on the flat ground, which is difficult to adapt to the complex scene of the stair climbing for robots.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

Figure 1:
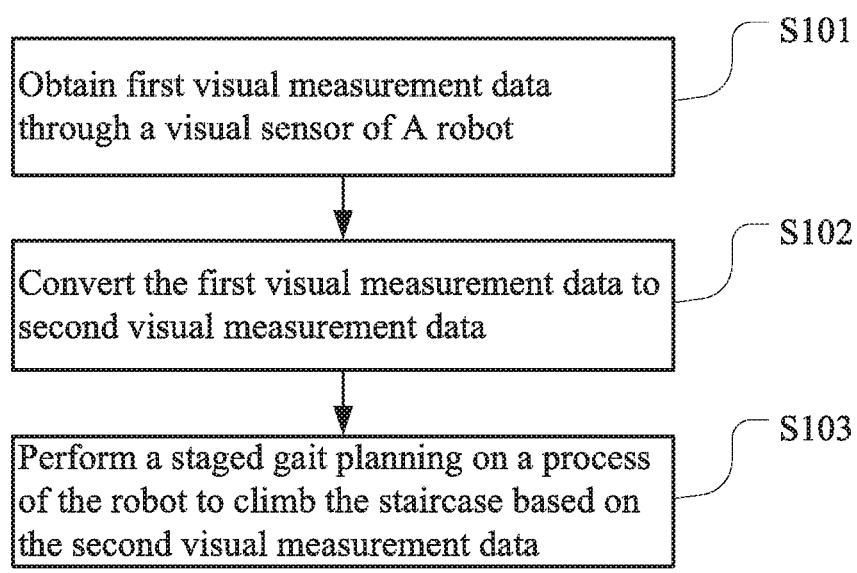
FIG. 1 is a flow chart of an embodiment of a stair climbing gait planning method according to the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" or ("comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third" and the like in the descriptions are only used for distinguishing, and cannot be understood as indicating or implying relative importance.

In the embodiments of the present disclosure, a stair-climbing method is performed based on a humanoid robot, which uses visual data to perform localization and stair climbing gait planning. Since gait parameters are provided based on the supporting leg, positive kinematics data is used to correct visual measurement data. The gait planning is performed at a flat ground stage in front of a staircase and the stair-climbing process, and eventually complete the stair-climbing task of the robot with the help of visual data. It should be noted that, in the embodiments of the present disclosure, the robots are all biped robots.

FIG. 1 is a flow chart of an embodiment of a stair climbing gait planning method according to the present disclosure. In this embodiment, a stair climbing gait planning method for a biped robot is provided, where the biped robot has two legs, and each leg has a foot. The method is a computer-implemented method executable for a processor. In one embodiment, the method may be implemented through and applied to a stair climbing gait planning apparatus shown in FIG. 12 or implemented through and applied to a robot shown in FIG. 13. As shown in FIG. 1, the method includes the following steps.

S101: obtaining first visual measurement data through a visual sensor of the robot.

In which, the first visual measurement data is pose (i.e., position and posture) data of a preset marker on a step of a staircase, where the pose data is in a body coordinate system of the robot.

In this embodiment, it can dispose one marker on each step of the staircase in advance, and the marker to be disposed can be selected according to the actual conditions. For instance, a red marker bar that is easy for the robot to recognize can be used. In other embodiment, an anti-slip strip on the step of the staircase can be adopted as the marker. The center of the marker is the ideal landing point of a certain fixed position of a foot of the robot when climbing the staircase, where the fixed position includes but is not limited to the ankle, toe and heel. In the following description, the toe is taken as an example.

The robot can detect the marker on each step through the visual sensor installed thereon. The visual sensor can be an RGB-D camera, or other types of cameras that can obtain depth data, such as monocular camera. The position of the visual sensor may be determined according to actual conditions. In this embodiment, the visual sensor is installed at a self-defined position, such as a virtual center of mass of the robot.

Figure 2:
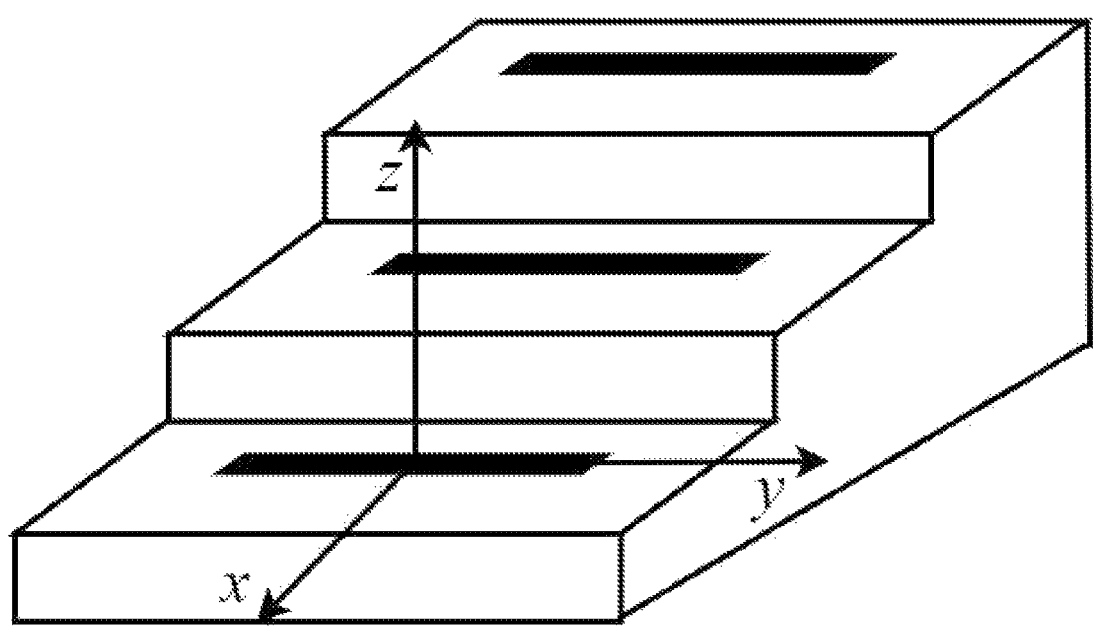
FIG. 2 is a schematic diagram of a camera coordinate system according to an embodiment of the present disclosure.
Figure 3:
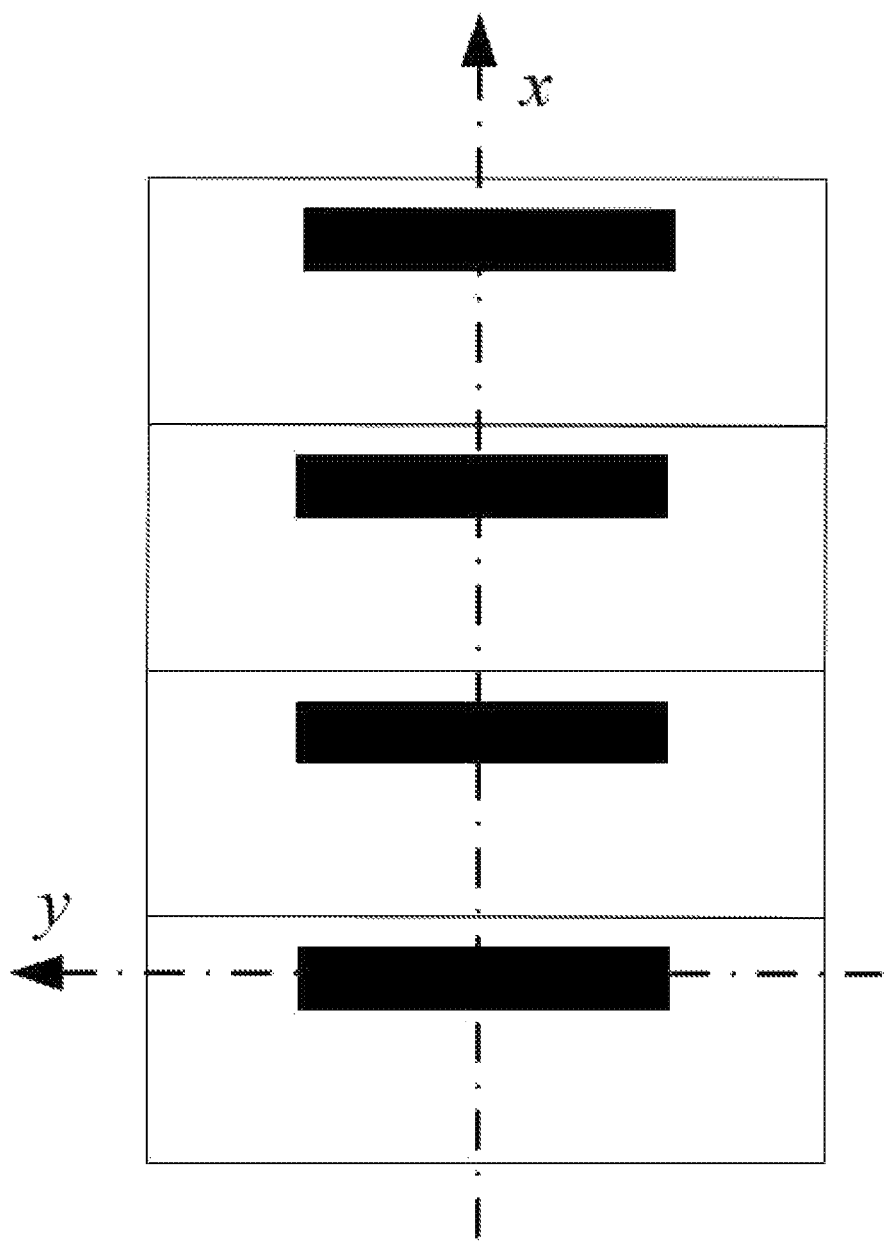
FIG. 3 is a schematic diagram of a body coordinate system according to an embodiment of the present disclosure.

The robot can convert the detected pose data of the marker from a camera coordinate system of the visual sensor to a body coordinate system of the robot, thereby obtaining the first visual measurement data. In which, the positions of the origins of the camera coordinate system and the body coordinate system are at the virtual center of mass of the robot, while their definitions of directions are inconsistent. FIG. 2 is a schematic diagram of a camera coordinate system according to an embodiment of the present disclosure. As shown in FIG. 2, the x direction is the direction that the back of the robot is facing, the y direction is the direction of the right side of the robot, the z direction is the upward direction, and the black bars in the figure are the markers. FIG. 3 is a schematic diagram f a body coordinate system according to an embodiment of the present disclosure. As shown in FIG. 3, the forward direction (x axis) is the direction that the robot is facing, the lateral direction (y S s the direction of the left side of the robot, and the height direction (z axis) is the upward direction.

S102: converting the first visual measurement data to second visual measurement data.

In which, the second visual measurement data is pose data of the marker in a gait reference coordinate system of the robot.

Gait parameters such as the step length (that is, the forward displacement of the swinging leg of the robot with respect to the supporting leg of the robot), the step width (that is, the lateral displacement of the swinging leg with respect to the virtual center of mass), the step height (that is, the height displacement of the swinging leg with respect to the supporting leg), the yaw angle (that is, the angle of a line between the virtual center of mass and the middle of the marker with respect to the forward direction) are not necessarily provided under the body coordinate system of the robot. In which, since the step length and the step height are provided based on the position of the supporting leg, the step width is provided based on the position of the virtual center of mass, and the yaw angle is provided based on the body coordinate system, it is necessary to convert the measurement data when planning the gait parameters so as to convert the gait parameters to the gait reference coordinate system of the robot, where the x, y, and z directions of the gait reference coordinate system are consistent with the body coordinate system, but the origin of the x axis and z axis of the gait reference coordinate system is at the toe of the supporting leg of the robot, and the origin of the y direction and yaw direction is at the projection of the virtual central of mass on the ground.

In this embodiment, it can divide the process of the robot to climb the staircase into two stages of a flat ground stage and a stair climbing stage, where the flat ground stage is a stage that the robot detects the marker on the first step and is navigated to a certain fixed position in front of the staircase, and the stair climbing stage is a stage that the robot steps up the steps one by one in a manner of alternate left and right feet so that the toes of the left and right feet reach the center of each step in turn.

Figure 4:
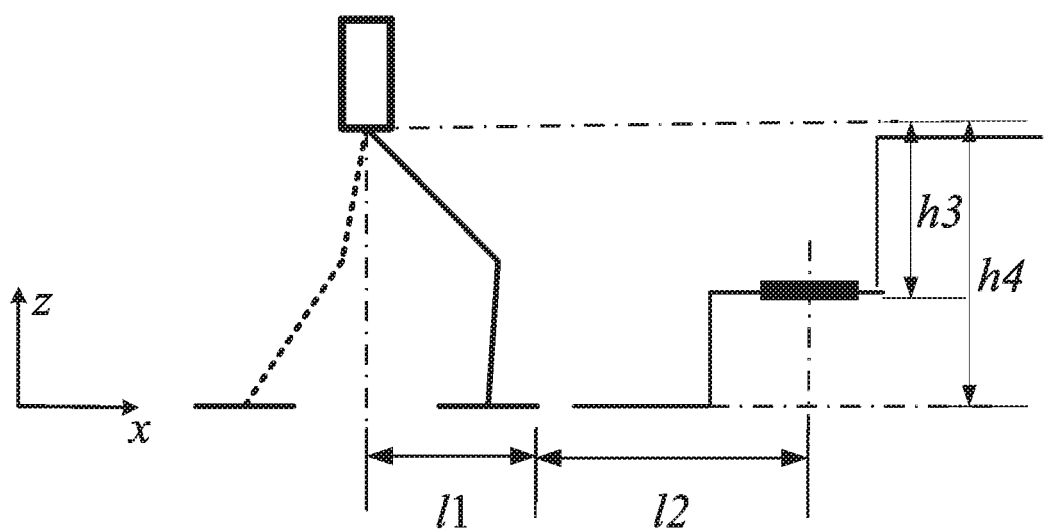
FIG. 4 is a schematic diagram of the flat ground stage in the forward direction and the height direction according to an embodiment of the present disclosure.
Figure 5:
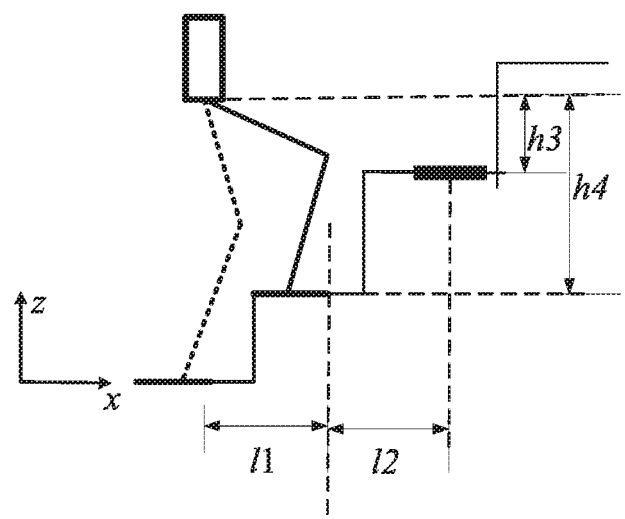
FIG. 5 is a schematic diagram of the stair climbing stage in the forward direction and the height direction according to an embodiment of the present disclosure.

FIG. 4 is a schematic diagram of the flat ground stage in the forward direction and the height direction according to an embodiment of the present disclosure; and FIG. 5 is a schematic diagram of the stair climbing stage in the forward direction and the height direction according to an embodiment of the present disclosure. As shown in FIG. 4 and FIG. 5, in the forward direction, the sum of the two distances 11 and 12 is the distance of the marker which is measured by the visual sensor, that is, the component of the first visual measurement data in the forward direction which is denoted as x_dis_from_vision, where the distance 11 is the distance in the forward direction that is from the installation position of the visual sensor (camera mount point) to the position of the toe of the supporting leg, which is denoted as x_cam2foot, and the distance in the forward direction that is from the supporting leg to the marker can be calculated based on the following formula:

$$x\_dis = x\_dis\_from\_vision - x\_cam2foot;$$

where, x_dis is the distance in the forward direction which is from the supporting leg to the marker, that is, the component of the second visual measurement data in the forward direction.

Similarly, in the height direction, the distance h3 is the height of the marker which is measured by the visual sensor, that is, the component of the first visual measurement data in the height direction, which is denoted as z_dis_from_vision, and the distance h4 is the distance in the height direction that is from the installation position of the visual sensor to the position of the toe of the supporting leg in the height direction, which is denoted as z_cam2foot, and the distance from the supporting leg to the marker in the height direction can be calculated based on the following formula:

$$z\_dis = z\_cam2foot - z\_dis\_from\_vision;$$

where, z_dis is the distance from the supporting leg to the marker in the height direction, that is, the component of the second visual measurement data in the height direction.

Figure 6:
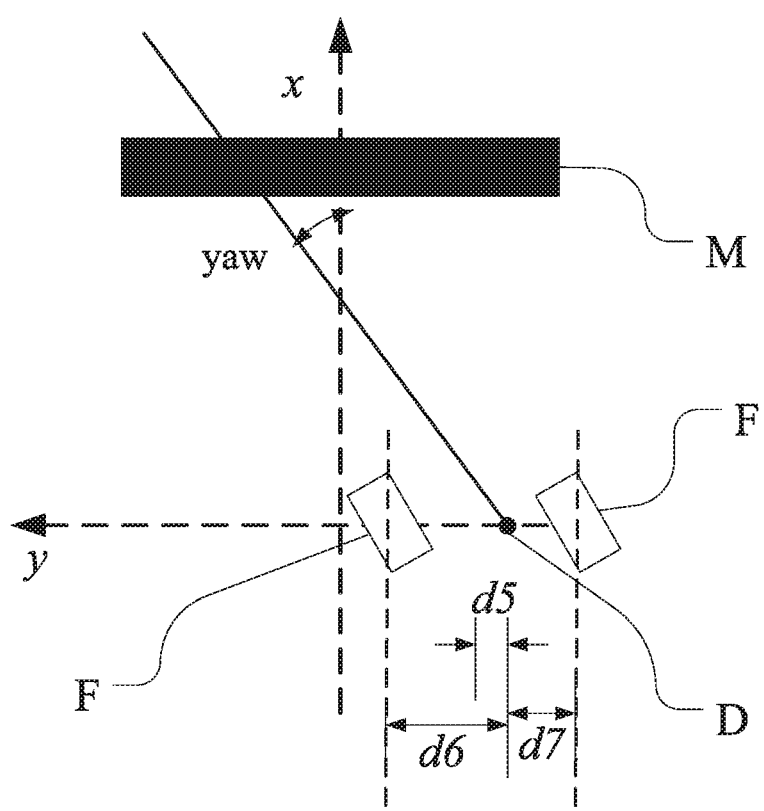
FIG. 6 is a schematic diagram of the lateral direction and the yaw direction according to an embodiment of the present disclosure.

FIG. 6 is a schematic diagram of the lateral direction and the yaw direction according to an embodiment of the present disclosure. As shown in FIG. 6, the black dot D in the figure represents the projection of the virtual center of mass (i.e., the projection of the camera mount point on the ground), the small white rectangle represents the projection of the two feet F on the ground, and the black bar represents the marker M. In which, in the lateral direction, the distance d6 is the distance from the virtual center of mass to the left foot in the body coordinate system, which is denoted as ly_com, the distance d7 is the distance from the virtual center of mass to the right foot in the body coordinate system, which is denoted as ry_com, and the distance d5 is the offset of the virtual center of mass, which is denoted as y_cam2foot and meets:

y_cam2foot=(ly_vision+ry_vision)/2;

Then, the distance from the supporting leg to the marker in the lateral direction can be calculated based on the following formula:

y_dis=y_dis_from_vision−y_cam2foot;

where, y_dis_from_vision is the component of the first visual measurement data in the lateral direction, and y_dis is the distance from the supporting leg to the marker in the lateral direction, that is, the component of the second visual measurement data in the lateral direction.

In the yaw direction, since the yaw angle is with respect to the world coordinate system, and the deflection of the yaw angle is also with respect to the world coordinate system, no conversion is needed, hence:

yaw_dis=yaw_dis_from_vision;

where, yaw_dis_from_vision is the component of the first visual measurement data in the yaw direction, and yaw_dis is the component of the second visual measurement data in the yaw direction.

The resulting pose data of the marker in the gait reference coordinate system, that is, the second visual measurement data (denoted as "dis"), is:

dis=(x_dis,y_dis,z_dis,yaw_dis)$^T$;

where, is the transpose operation.

S103: performing a staged gait planning on a process of the robot to climb the staircase based on the second visual measurement data.

Figure 7:
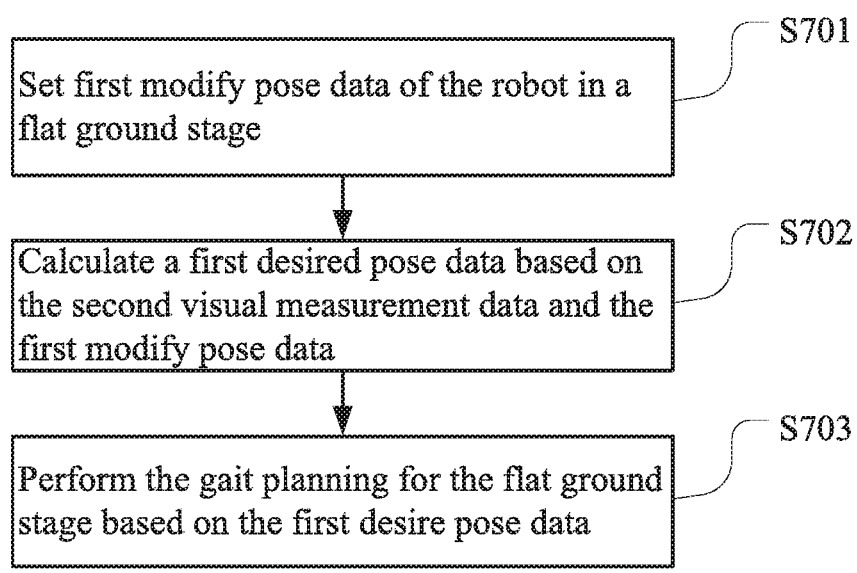
FIG. 7 is a flow chart of the gait planning for the flat ground stage according to the method of FIG. 1.

FIG. 7 is a flow chart of the gait planning for the flat ground stage according to the method of FIG. 1. As shown in FIG. 7, the gait planning in the flat ground stage can include the following steps.

S701: setting first modify pose data of the robot in a flat ground stage.

In this embodiment, the first modify pose data of the robot in the flat ground stage is set based on the formula of:

mod=(x_set,0,z_set0)$^T$.

where, x_set is a distance between a toe of a support leg of the robot and the marker in the forward direction, z_set is a distance between the toe of the support leg and the marker in the height direction, position data in the lateral direction and the yaw direction are 0.

S702: calculating a first desired pose data based on the second visual measurement data and the first modify pose data.

In this embodiment, the first desire pose data can be calculated based on the following formula:

des=dis−mod;

where, des is the first desire pose data, dis is the second visual measurement data, and mod is the first modify pose data.

S703: performing the gait planning for the flat ground stage based on the first desire pose data.

In this embodiment, the gait planning for the flat ground stage can be performed in each of the forward direction, the lateral direction, the height direction, and the yaw direction based on the formula of:

$$\begin{cases} g0, & g_{des} > \text{threshold 1} \\ -g0, & g_{des} < -\text{threshold 1} \\ k*g_{des}, & \text{threshold 2} \leq \text{abs}(g_{des}) \leq \text{threshold 1} \\ 0, & \text{abs}(g_{des}) < \text{threshold 2} \end{cases};$$

where, g0 is a preset reference movement amount in the target directions, $g_{des}$ is a component of the first desire pose data in the target directions, k is a preset adjustment coefficient and k=g0/threshold1, threshold1 is a preset first threshold, threshold2 is a preset second threshold and threshold1>threshold2, abs is an absolute value function, and gvel is the movement amount in the target directions. It can be seen that, in the case that the first desire pose data is beyond the first threshold, coarse positioning is performed and quickly enters threshold1; and in the case that the first desire pose data is within the first threshold, precise positioning is performed until it enters the allowable desired threshold2, then the positioning is successful.

Figure 8:
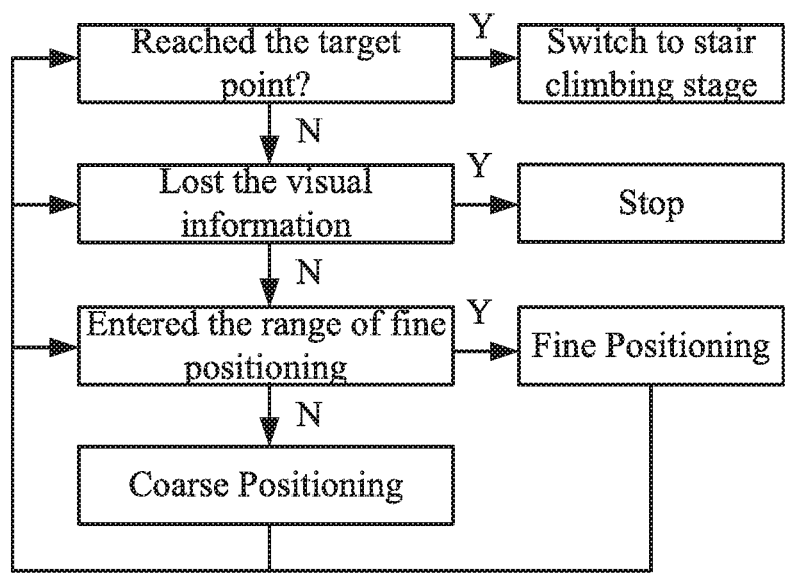
FIG. 8 is a schematic diagram of the gait planning for the flat ground stage according to the method of FIG. 1.

FIG. 8 is a schematic diagram of the gait planning for the flat ground stage according to the method of FIG. 1. During the process of the movement of the robot, it is determined whether the robot has reached a target point (that is, a fixed position in front of the staircase). In the case that the robot has not yet reached the target point, it is determined whether the visual data is lost; if yes, the robot is stopped; otherwise, it is determined whether the robot has entered the range of fine positioning; if yes, fine positioning is performed; otherwise, coarse positioning is performed until the robot reaches the target point, then it switches to the gait planning for the stair climbing stage.

The gait planning for the stair climbing stage in the lateral direction and the yaw direction is similar to the process shown in FIG. 7. The second modify pose data of the robot in the stair climbing stage is first set, where in the case that the robot steps up the steps one by one, the target of each step is: des=(0,0,0,0)$^T$, then the second desired pose data is calculated based on the second visual measurement data and the second modify pose data, and then the gait planning for the stair climbing stage in each of the forward direction, the lateral direction, the height direction, and the yaw direction is performed based on the second desired pose data. For the specific process, please refer to the relevant description corresponding to FIG. 7 in the foregoing, which will not be repeated herein. In one embodiment, the second modify pose data of the robot in the stair climbing stage is set based on the formula of:

mod=(x_set,0,z_set,0)$^T$;

where, x_set is a distance between a toe of a support leg of the robot and the marker of a next step in the forward direction, z_set is a distance between the toe of the support leg and the marker of the next step in the height direction, position data in the lateral direction and the yaw direction are 0.

In one embodiment, the gait planning for the stair climbing stage in each of the lateral direction and the yaw direction is performed based on the formula of:

$$gvel = \begin{cases} g0, & g_{des} > \text{threshold 1} \\ -g0, & g_{des} < -\text{threshold 1} \\ k*g_{des}, & \text{threshold 2} \leq \text{abs}(g_{des}) \leq \text{threshold 1} \\ 0, & \text{abs}(g_{des}) < \text{threshold 2} \end{cases}.$$

Figure 9:
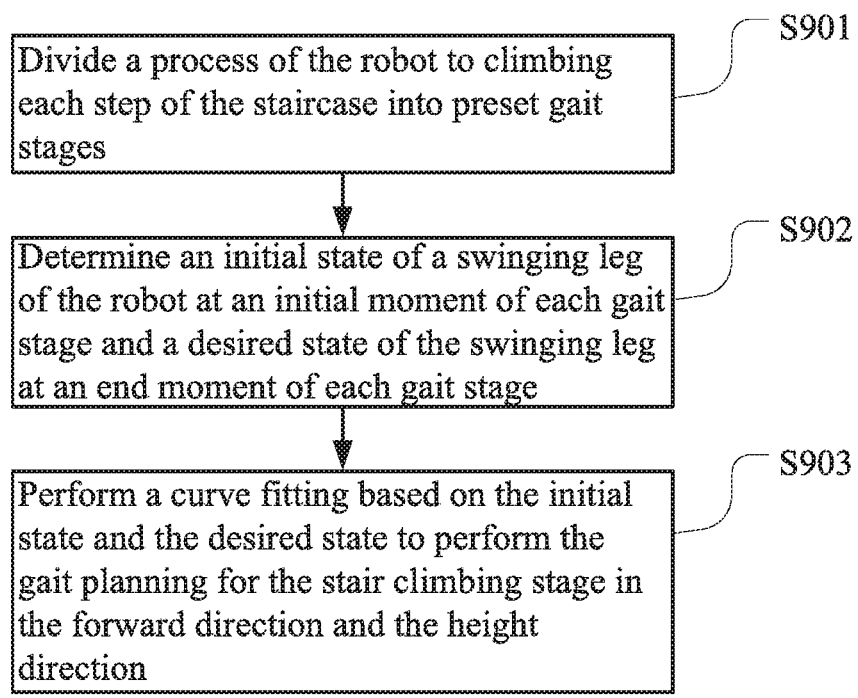
FIG. 9 is a flow chart of the gait planning for the stair climbing stage in the forward direction and the height direction according to the method of FIG. 1.

However, the stair climbing stage in the forward direction and height direction needs to consider the geometric constraints of the steps, and cannot be directly planned like walking on flat ground. The swinging leg cannot cross the enveloping surface of the step during the whole swinging period (denoted as T) to avoid the robot from being tripped over by the steps during the lifting of the leg. FIG. 9 is a flow chart of the gait planning for the stair climbing stage in the forward direction and the height direction according to the method of FIG. 1. As shown in FIG. 9, the gait planning for the stair climbing stage in the forward direction and height direction can include the following steps.

Figure 10:
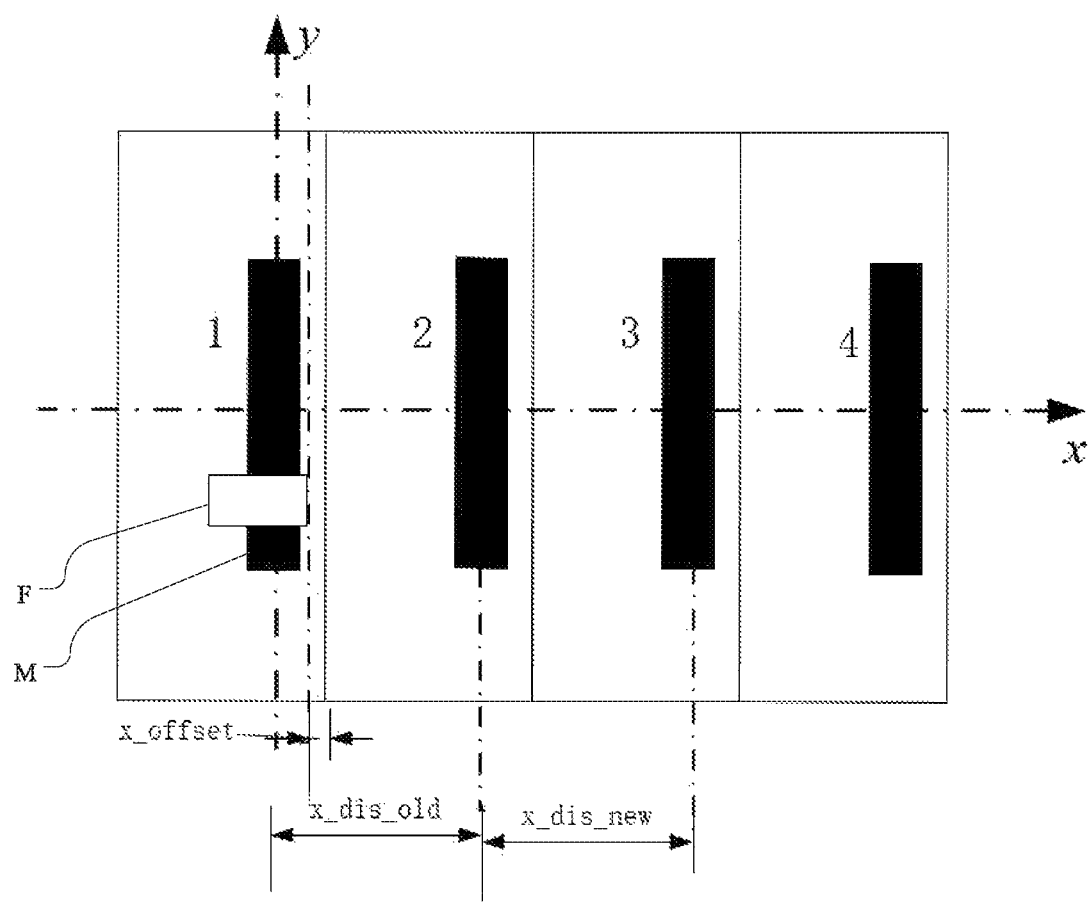
FIG. 10 is a projection view of the steps of a staircase according to an embodiment of the present disclosure.

S901: dividing a process of the robot climbing each step of the staircase into preset gait stages, FIG. 10 is a projection view of the steps of a staircase according to an embodiment of the present disclosure. As shown in FIG. 10, in this embodiment, the process of the robot to climb each step can be divided into three gait stages. Assuming that the current supporting leg is at the second step (i.e., the step indicated by the number 2 in the figure) and the swinging leg is at the first step (i.e., the step indicated by the number 1 in the figure), the swinging leg will then be taken from the first step to the third step (i.e., the step indicated by the number 3 in the figure), then the first stage is the stage that the swinging leg starts to move (marked as time 0) to cross the first step (marked as time t1), the second stage is the stage that the swinging leg crosses the first step to cross the second step (marked as time t2), and the third stage is the stage that the swinging leg crosses the second step to fall on the third step (marked as time T).

S902: determining an initial state of a swinging leg of the robot at an initial moment of each gait stage and a desired state of the swinging leg at an end moment of each gait stage.

In which, both the initial state and the desired state include positions in the forward direction and the height direction.

In this embodiment, in the first stage (time 0-t1), the initial position in the forward direction is set to 0, and the initial position in the height direction is set to 0, that is, $x(0)=0$ and $z(0)=0$, the end position in the forward direction is set to $x\_offset$, and the end position in the height direction is set to a value greater than $z\_dis\_old$, that is, $x(t1)=x\_offset$ and $z(t1)>z\_dis\_old$. That is to say, when crossing the first step, the height of the swinging leg is higher than the height of the first step, where $x\_offset$ is the distance from a toe of a support leg of the robot to the front edge of the next step in the forward direction, and $z\_dis\_old$ is the component of the last second visual measurement data in the height direction.

In the second stage (time t1-t2), the initial position in the forward direction is set to $x\_offset$, and the initial position in the height direction is set to the end position of the first stage, that is, $x(t1)=x\_offset$ and $z(t1)>z\_dis\_old$; the end position in the forward direction is set to the sum of $x\_dis\_old$ and $x\_offset$, and the end position in the height direction is set to a value greater than the sum of $z\_dis\_old$ and $z\_dis\_new$, that is, $x(t2)=x\_dis\_old+x\_offset$ and $z(t2)>z\_dis\_old+z\_dis\_new$. That is to say, when crossing the second step, the height of the swinging leg is higher than the height of the second step, where $x\_dis\_old$ is the component of the last second visual measurement data in the forward direction, and $z\_dis\_new$ is the component of the current second visual measurement data in the height direction;

In the third stage (time t2-T), the initial position in the forward direction is set to the end position of the preset second stage, and the initial position in the height direction is set to the end position of the second stage, that is, $x(t2)=x\_dis\_old+x\_offset$ and $z(t2)>z\_dis\_old+z\_dis\_new$, and the end position in the forward direction is set to the sum of $x\_dis\_old$ and $x\_dis\_new$, and the end position in the height direction is set to the sum of $z\_dis\_old$ and $z\_dis\_new$, that is, $x(T)=x\_dis\_old+x\_dis\_new$ and $z(T)=z\_dis\_old+z\_dis\_new$. That is to say, at the end of the swing period, the swinging leg falls exactly on the marker of the third step, where $x\_dis\_new$ is the component of the current second visual measurement data in the forward direction.

It can be understood that, the above process is only the process of the robot to climb a certain step, and the process of climbing the other steps is similar, which will not be repeated herein. However, it should be noted that, $x\_dis\_new$ when climbing the previous step will become $x\_dis\_old$ when climbing the next step, $z\_dis\_new$ when climbing the previous step will become $z\_dis\_old$ when climbing the next step, and $x\_dis\_new$ and $z\_dis\_new$ when climbing the next step can be extracted from the second visual measurement data updated at that time.

S903: performing a curve fitting based on the initial and the desired state to perform the gait planning for the stair climbing stage in the forward direction and the height direction.

In the planning process, for each gait stage, it can determine a smooth motion curve from the initial state to the desired state by curve fitting, so as to perform the gait planning of the stair climbing stage in the forward direction and the height direction. This motion curve includes but is not limited to a cubic polynomial curve, a sigmoid curve, a cubic spline curve, a cubic Hermite curve and a Bezier curve.

It should be noted that, the above gait planning process is based on real-time visual measurement data, that is, this is an online planning process. If the visual measurement data is lost during the process of climbing the staircase, at this time, the gait planning can be switched to offline planning, that is, performing the gait planning for the stair climbing stage based on the width and height data of the step which is measured offline. For example, if the visual measurement data and the offline measurement data are, too different from each other, it is considered that the visual data is missing or abnormal, and offline planning can be adopted.

Figure 11:
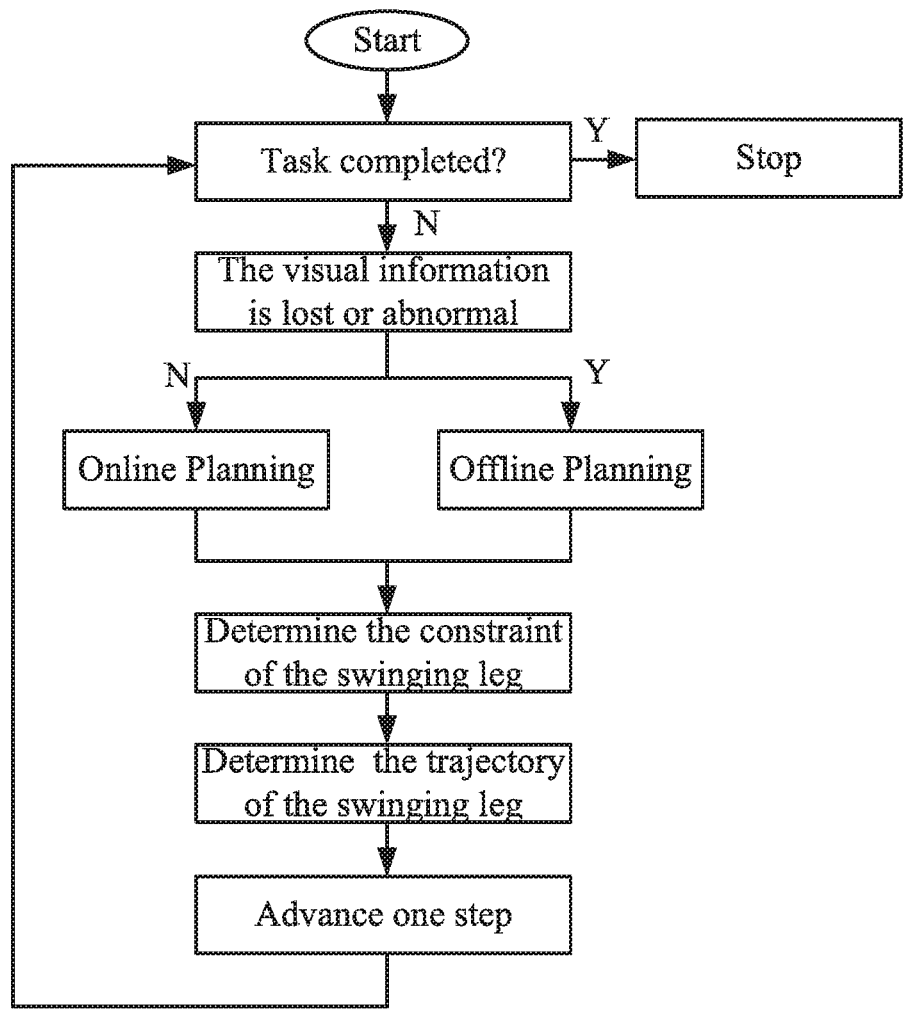
FIG. 11 is a schematic diagram of the gait planning for the stair climbing stage according to the method of FIG. 1.

FIG. 11 is a schematic diagram of the gait planning for the stair climbing stage according to the method of FIG. 1. As shown in FIG. 11, during the movement of the robot, it is determined whether it has completed the task of climbing the staircase. If not, it is determined whether the visual data is lost or abnormal. If the visual data is not lost or abnormal, online planning will be performed; otherwise, offline planning will be performed. Eventually, it determines the constraint and the trajectory of the swinging leg, controls the robot to advance one step, and repeats the above process until the task of climbing the staircase is completed, and then stops the robot.

In summary, in this embodiment, it obtains first visual measurement data through a visual sensor of the robot, where the first visual measurement data is pose data of a preset marker on a step of a staircase in a body coordinate system of the robot; converting the first visual measurement data to obtain second visual measurement data, where the second visual measurement data is pose data of the marker in a gait reference coordinate system of the robot; and performs a staged gait planning on a process of the robot to climb the staircase based on the second visual measurement data. In which, the markers are disposed on the steps of the staircase in advance, which provides a reliable reference for the gait planning of the robot when climbing the staircase.

When climbing the staircase, the pose data of the markers in the body coordinate system, that is, the first visual measurement data can be obtained through the visual sensor to convert to the gait reference coordinate system to obtain the second visual measurement data. By using this visual measurement data as a reference, the staged gait planning can be performed on the process of the robot to climb the staircase, which greatly improves the adaptability of the robot in the complex scene of stair climbing.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 12:
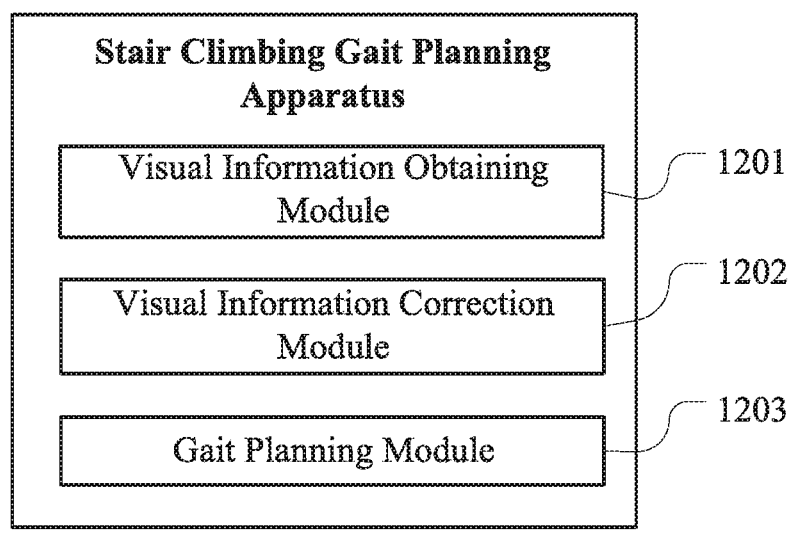
FIG. 12 is a schematic block diagram of an embodiment of a stair climbing gait planning apparatus according to the present disclosure.

FIG. 12 is a schematic block diagram of an embodiment of a stair climbing gait planning apparatus according to the present disclosure. As shown in FIG. 12, a stair climbing gait planning apparatus corresponding to the stair climbing gait planning method described in the above embodiment is provided.

In this embodiment, the stair climbing gait planning apparatus can include:

a visual data obtaining module 1201 configured to obtain first visual measurement data through a visual sensor of a robot, where the first visual measurement data is pose data of a preset marker on a step of a staircase in a body coordinate system of the robot;

a visual data correction module 1202 configured to convert the first visual measurement data to second visual measurement data, where the second visual measurement data is pose data of the marker in a gait reference coordinate system of the robot; and a gait planning module 1203 configured to perform a staged gait planning on a process of the robot to climb the staircase based on the second visual measurement data.

Those skilled in the art can clearly understand that, for the convenience and conciseness of the description, the specific working processes of the above-mentioned apparatus, modules and units can refer to the corresponding processes in the foregoing method embodiments, which will not be repeated herein.

In the above-mentioned embodiments, the description of each embodiment has its focuses, and the parts which are not described or mentioned in one embodiment may refer to the related descriptions in other embodiments.

In this embodiment, each of the above-mentioned modules/subunits is implemented in the form of software, which can be computer program(s) stored in a memory of the stair climbing gait planning apparatus and executable on a processor of the stair climbing gait planning apparatus. In other embodiments, each of the above-mentioned modules/subunits may be implemented in the form of hardware (e.g., a circuit of the stair climbing gait planning apparatus which is coupled to the processor of the stair climbing gait planning apparatus) or a combination of hardware and software (e.g., a circuit with a single chip microcomputer.

Figure 13:
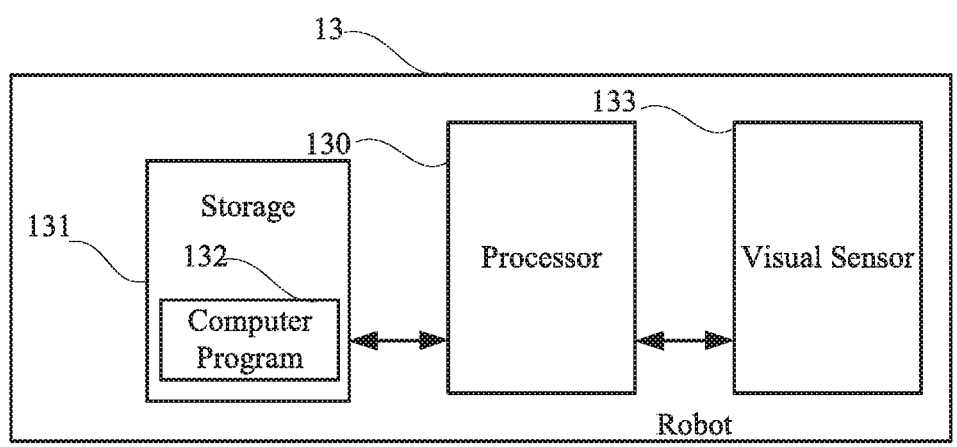
FIG. 13 is a schematic block diagram of an embodiment of a robot according to the present disclosure.

FIG. 13 is a schematic block diagram of an embodiment of a robot according to the present disclosure. For ease of description, only parts related to this embodiment are shown. In this embodiment, a robot 13 is provided. As shown in FIG. 13, in this embodiment, the robot 13 includes a processor 130, a storage 131, a computer program 132 stored in the storage 131 and executable on the processor 130, and a visual sensor 133. When executing (instructions in) the computer program 132, the processor 130 implements the steps in the above-mentioned embodiments of the stair climbing gait planning method, for example, steps S101-S103 shown in FIG. 1. Alternatively, when the processor 130 executes the (instructions in) computer program 132, the functions of each module unit in the above-mentioned device embodiments, for example, the functions of the modules 1201-1203 shown in FIG. 12 are implemented.

Exemplarily, the computer program 132 may be divided into one or more modules/units, and the one or more modules/units are stored in the storage 131 and executed by the processor 130 to realize the present disclosure. The one or more modules/units may be a series of computer program instruction sections capable of performing a specific function, and the instruction sections are for describing the execution process of the computer program 132 in the robot 13.

The robot 13 may include, but is not limited to, the processor 130 and the storage 131. It can be understood by those skilled in the art that FIG. 13 is merely an example of the robot 13 and does not constitute a limitation on the robot 13, and may include more or fewer components than those shown in the figure, or a combination of some components or different components. For example, the robot 13 may further include an input/output device, a network access device, a bus, and the like.

The processor 130 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 131 may be an internal storage unit of the robot 13, for example, a hard disk or a memory of the robot 13. The storage 131 may also be an external storage device of the robot 13, for example, a plug-in hard disk, a smart media card (SMC), a secure digital (SD) card, flash card, and the like, which is equipped on the robot 13. Furthermore, the storage 131 may further include both an internal storage unit and an external storage device, of the robot 13. The storage 131 is configured to store the computer program 132 and other programs and data required by the robot 13. The storage 131 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module unit is implemented in the form of a software functional unit and is sold or used as an independent product, the integrated module unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented stair climbing gait planning method for a robot, comprising:

providing the robot comprising a processor, and a visual sensor electrically coupled to the processor;

obtaining, by the visual sensor, first visual measurement data, wherein the first visual measurement data is pose data of a preset marker on a step of a staircase in a body coordinate system of the robot;

convening, by the processor, the first visual measurement data to second visual measurement data, wherein the second visual measurement data is pose data of the marker in a gait reference coordinate system of the robot; and performing, by the processor, a staged gait planning for the robot to climb the staircase based on the second visual measurement data, and controlling, by the processor, the robot to advance one step of the staircase according to the staged gait planning;

wherein the step of converting, by the processor, the first visual measurement data to second visual measurement data comprises:

converting, by the processor, the first visual measurement data based on the formulas of:

$$x\_dis = x\_dis\_from\_vision - x\_cam2foot;$$

$$z\_dis = z\_cam2foot - z\_dis\_from\_vision;$$

$$y\_dis = y\_dis\_from\_vision - y\_cam2foot; \text{ and}$$

$$yaw\_dis = yaw\_dis\_from\_vision;$$

wherein, x_dis_from_vision is a component of the first visual measurement data in a forward direction, y_dis_from_vision is a component of the first visual measurement data in a lateral direction, and z_dis_from_vision is a component of the first visual measurement data in a height direction, yaw_dis_from_vision is a component of the first visual measurement data in a yaw direction, x_dis is a component of the second visual measurement data in the forward direction, and y_dis is a component of the second visual measurement data in the lateral direction, z_dis is a component of the second visual measurement data in the height direction, yaw_dis is a component of the second visual measurement data in the yaw direction, x_cam2foot is the distance from an installation position of the visual sensor to a toe position of a supporting leg in the forward direction y_cam2foot is the offset of a position of a center of mass of the robot, and z_cam2foot is the distance from the installation position of the visual sensor to the toe position of the supporting leg in the height direction.

2. The method of claim 1, wherein the step of performing, by the processor, the staged gait planning comprises:
   in a flat ground stage, setting, by the processor, first modify pose data of the robot;
   calculating, by the processor, a first desired pose data based on the second visual measurement data and the first modify pose data; and
   performing, by the processor, the gait planning for the flat ground stage based on the first desire pose data.

3. The method of claim 2, wherein the step of performing, by the processor, the gait planning for the flat ground stage based on the first desire pose data comprises:
   performing, by the processor, the gait planning for the flat ground stage in each of a forward direction, a lateral direction, a height direction, and a yaw direction, based on the formula of:

$$gvel = \begin{cases} g0, & g_{des} > \text{threshold 1} \\ -g0, & g_{des} < -\text{threshold 1} \\ k*g_{des}, & \text{threshold 2} \leq \text{abs}(g_{des}) \leq \text{threshold 1} \\ 0, & \text{abs}(g_{des}) < \text{threshold 2} \end{cases};$$

wherein g0 is a preset reference movement amount in the target directions, $g_{des}$ is a component of the first desire pose data in the target directions, k is a preset adjustment coefficient, threshold1 is a preset first threshold, threshold2 is a preset second threshold and threshold1>threshold2, abs is an absolute value function, and gvel is the movement amount in the target directions.

4. The method of claim 2, wherein the step of setting, by the processor, the first modify pose data of the robot in the flat ground stage comprises:
   setting, by the processor, the first modify pose data of the robot in the flat ground stage based on the formula of:

$$\text{mod}=(x\_set,0,z\_set0)^T;$$

wherein, x_set is a distance between a toe of a support leg of the robot and the marker in the forward direction, z_set is a distance between the toe of the support lea and the marker in the height direction, position data in the lateral direction and the yaw direction are 0.

5. The method of claim 1, wherein the step of performing, by the processor, the staged gait planning comprises:
   setting, by the processor, second modify pose data of the robot in a stair climbing stage;
   calculating, by the processor, a second desired pose data based on the second visual measurement data and the second modify pose data; and
   performing, by the processor, the gait planning for the stair climbing stage in each of a forward direction, a lateral direction, a height direction, and a yaw direction based on the second desired pose data.

6. The method of claim 5, wherein the step of performing, by the processor, the gait planning for the stair climbing stage comprises:
   performing, by the processor, the gait planning for the stair climbing stage in each of the lateral direction and the yaw direction based on the formula of:

$$gvel = \begin{cases} g0, & g_{des} > \text{threshold 1} \\ -g0, & g_{des} < -\text{threshold 1} \\ k*g_{des}, & \text{threshold 2} \leq \text{abs}(g_{des}) \leq \text{threshold 1} \\ 0, & \text{abs}(g_{des}) < \text{threshold 2} \end{cases}.$$

7. The method of claim 5, further comprising:
   dividing, by the processor, a process of the robot climbing each step of the staircase into preset gait stages;
   determining, by the processor, an initial state of a swinging leg of the robot at an initial moment of each gait stage and a desired state of the swinging leg at an end moment of each gait stage, wherein both the initial state and the desired state comprise positions in the forward direction and the height direction; and
   performing, by the processor, a curve fitting based on the initial state and the desired state to perform the gait planning for the stair climbing stage in the forward direction and the height direction.

8. The method of claim 7, wherein the step of determining, by the processor, the initial state of the swinging leg of the robot at the initial moment of each gait stage and the desired state of the swinging leg at the end moment of each gait stage comprises:
   in a preset first gait stage, setting, by the processor, an initial position in the forward direction to 0, setting an initial position in the height direction to 0, setting an end position in the forward direction to x_offset, and setting an end position in the height direction to a preset value greater than z_dis_old; wherein x_offset is the distance from a toe of a support leg of the robot to a front edge of a next step in the forward direction, and z_dis_old is a component of last second visual measurement data in the height direction;
   in a preset second stage, setting, by the processor, the initial position in the forward direction to x_offset, setting the initial position in the height direction to the end position of the preset first stage, setting the end position in the forward direction to the sum of x_dis_old and x_offset, and setting the end position in the height direction to a value greater the sum of z_dis_old and z_dis_new; wherein x_dis_old is a component of the last second visual measurement data in the forward direction, and z_dis_new is a component of the current second visual measurement data in the height direction; and
   in a preset third stage, setting, by the processor, the initial position in the forward direction to the end position of the preset second stage, setting the initial position in the height direction to the end position of the preset second stage, setting the end position in the forward direction to the sum of x_dis_old and x_dis_new, and setting the end position in the height direction to the sum of z_dis_old and z_dis_new; wherein x_dis_new is a component of the current second visual measurement data in the forward direction.

9. The method of claim 5, wherein the step of setting, by the processor, the second modify pose data of the robot in the stair climbing stage comprises:
   setting, by the processor, the second modify pose data of the robot in the stair climbing stage based on the formula of:

$$\text{mod}=(x\_set,0,z\_set0)^T;$$

wherein, x_set is a distance between a toe of a support leg of the robot and the marker of a next step in the forward direction, z_set is a distance between the toe of the support leg and the marker of the next step in the height direction, position data in the lateral direction and the yaw direction are 0.

10. A robot, comprising:
a memory;
a processor;
a visual sensor electrically coupled to the processor; and
one or more computer programs stored in the memory and executable on the processor, wherein the one or more computer programs comprise:
instructions for obtaining first visual measurement data through the visual sensor of the robot, wherein the first visual measurement data is pose data of a preset marker on a step of a staircase M a body coordinate system of the robot;
instructions for converting the first visual measurement data to second visual measurement data, wherein the second visual measurement data is pose data of the marker in a gait reference coordinate system of the robot; and
instructions for performing a staged gait planning for the robot to climb the staircase based on the second visual measurement data, and controlling the robot to advance one step of the staircase according to the staged gait planning;
wherein the instructions for converting the first visual measurement data to second visual measurement data comprise:
instructions for converting the first visual measurement data based on the formulas of $x\_dis = x\_dis\_from\_vision - x\_cam2foot;$ $z\_dis = z\_cam2foot - z\_dis\_from\_vision;$ $y\_dis = y\_dis\_from\_vision - y\_cam2foot;$ and $yaw\_dis = yaw\_dis\_from\_vision;$ wherein, x_dis_from_vision is a component of the first al measurement data in a forward direction, y_dis_from_vision is a component of the first visual measurement data in a lateral direction, and z_dis_from_vision is a component of the first visual measurement data in a height direction, yaw_dis_from_vision is a component of the first visual measurement data in a yaw direction, x_dis is a component of the second visual measurement data in the forward direction, and y_dis is a component of the second visual measurement data in the lateral direction, z_dis is a component of the second visual measurement data in the height direction, yaw_dis is a component of the second visual measurement data in the yaw direction x_cam2foot is the distance from an installation position of the visual sensor to a toe position of a supporting leg in the forward direction, y_cam2foot is the offset of a position of a center of mass of the robot, and z_cam2foot is the distance from the installation position of the visual sensor to the toe position of the supporting leg in the height direction.

11. The robot of claim 10, wherein the instructions for performing the staged gait planning comprise:
instructions for in a flat ground stage, setting first modify pose data of the robot;
instructions for calculating a first desired pose data based on the second visual measurement data and the first modify pose data; and
instructions for performing the gait planning for the flat ground stage based on the first desire pose data.

12. The robot of claim 11, wherein the instructions for performing the gait planning for the flat ground stage based on the first desire pose data comprise:
instructions for performing the gait planning for the flat ground stage in each of a forward direction, a lateral direction, a height direction, and a yaw direction, based on the formula of $$gvel = \begin{cases} g0, & g_{des} > \text{threshold 1} \\ -g0, & g_{des} < -\text{threshold 1} \\ k * g_{des}, & \text{threshold 2} \leq \text{abs}(g_{des}) \leq \text{threshold 1} \\ 0, & \text{abs}(g_{des}) < \text{threshold 2} \end{cases};$$

wherein, g0 is a preset reference movement amount in the target directions, $g_{des}$ is a component of the first desire pose data in the target directions, k is a preset adjustment coefficient, threshold1 is a preset first threshold, threshold2 is a preset second threshold and threshold1>threshold2, abs is an absolute value function, and gvel is the movement amount in the target directions.

13. The robot of claim 11, wherein the instructions for setting the first modify pose data of the robot in the flat ground stage comprise:
instructions for setting the first modify pose data of the robot in the flat ground stage based on the formula of:

$\text{mod} = (x\_set, 0, z\_set0)^T;$ wherein, x_set is a distance between a toe of a support leg of the robot and the marker in the forward direction, z_set is a distance between the toe of the support leg and the marker in the height direction, position data in the lateral direction and the yaw direction are 0.

14. The robot of claim 10, wherein the instructions for performing the staged gait planning comprise:
instructions for setting second modify pose data of the robot in a stair climbing stage;
instructions for calculating a second desired pose data based on the second visual measurement data and the second modify pose data; and
instructions for performing the gait planning for the stair climbing stage in each of a forward direction, a lateral direction, a height direction, and a yaw direction based on the second desired pose data.

15. The robot of claim 14, wherein the instructions for performing the gait planning for the stair climbing stage comprises:
instructions for performing the gait planning for the stair climbing stage in each of the lateral direction and the yaw direction based on the formula of:

$$gvel = \begin{cases} g0, & g_{des} > \text{threshold 1} \\ -g0, & g_{des} < -\text{threshold 1} \\ k * g_{des}, & \text{threshold 2} \leq \text{abs}(g_{des}) \leq \text{threshold 1} \\ 0, & \text{abs}(g_{des}) < \text{threshold 2} \end{cases}.$$

16. The robot of claim 14, wherein the one or more computer programs further comprise:
instructions for dividing a process of the robot climbing each step of the staircase into preset gait stages;

instructions for determining an initial state of a swinging leg, of the robot at an initial moment of each gait stage and a desired state of the swinging leg at an end moment of each gait stage, wherein both the initial state and the desired state comprise positions in the forward direction and the height direction; and instructions for performing a curve fitting based on the initial state and the desired state to perform the gait planning for the stair climbing stage in the forward direction and the height direction.

17. The robot of claim 16, wherein the instructions for determining the initial state of the swinging leg of the robot at the initial moment of each gait stage and the desired state of the swinging leg at the end moment of each gait stage comprise:

instructions for in a preset first gait stage, setting an initial position in the forward direction to 0, setting an initial position in the height direction to 0, setting an end position in the forward direction to x_offset, and setting an end position in the height direction to a preset value greater than z_dis_old; wherein x_offset is the distance from a toe of a support leg of the robot to a front edge of a next step in the forward direction, and z_dis_old is a component of last second visual measurement data in the height direction;

instructions for in a preset second stage, setting the initial position in the forward direction to x_offset, setting the initial position in the height direction to the end position of the preset first stage, setting the end position in the forward direction to the sum of x_dis_old and x_offset, and setting the end position in the height direction to a value greater the sum of z_dis_old and z_dis_new; wherein x_dis_old is a component of the last second visual measurement data in the forward direction, and z_dis_new is a component of the current second visual measurement data in the height direction; and instructions for in a preset third stage, setting the initial position in the forward direction to the end position of the preset second stage, setting the initial position in the height direction to the end position of the preset second stage, setting the end position in the forward direction to the sum of x_dis_old and x_dis_new, and setting the end position in the height direction to the sum of z_dis_old and z_dis_new; wherein x_dis_new is a component of the current second visual measurement data in the forward direction.

18. The robot of claim 14, wherein the instructions for setting the second modify pose data of the robot in the stair climbing stage comprise:

instructions for setting the second modify pose data of the robot in the stair climbing stage based on the formula of:

$$mod=(x\_set, 0, z\_set0)^T;$$

wherein, x_set is a distance between a toe of a support leg of the robot and the marker of a next step in the forward direction, z_set is a distance between the toe of the support leg and the marker of the next step in the height direction, position data in the lateral direction and the yaw direction are 0.

19. A computer-implemented stair climbing gait planning method, comprising:

providing a robot comprising a processor, and a visual sensor electrically coupled to the processor;

obtaining, by the visual sensor, first visual measurement data, wherein the first visual measurement data is pose data of a preset marker on a step of a staircase in a body coordinate system of the robot;

converting, by the processor, the first visual measurement data to second visual measurement data, wherein the second visual measurement data is pose data of the marker in a gait reference coordinate system of the robot, and wherein a forward direction, a lateral direction, and a height direction of the gait reference coordinate system are consistent with the body coordinate system of the robot, an origin of the forward direction and the height direction of the gait reference coordinate system is at a toe of a supporting leg of the robot, and an origin of the lateral direction and a yaw direction of the gait reference coordinate system is at a projection of a virtual central of mass on a ground; and performing, by the processor, a staged gait planning for the robot to climb the staircase based on the second visual measurement data, and controlling, by the processor, the robot to advance one step of the staircase according to the staged gait planning.

20. The method of claim 19, wherein the step of converting, by the processor, the first visual measurement data to second visual measurement data comprises:

converting, by the processor, the first visual measurement data based on the formulas of:

$$x\_dis=x\_dis\_from\_vision-x\_cam2foot;$$

$$z\_dis=z\_cam2foot-z\_dis\_from\_vision;$$

$$y\_dis=y\_dis\_from\_vision-y\_cam2foot; \text{ and}$$

$$yaw\_dis=yaw\_dis\_from\_vision;$$

wherein, x_dis_from_vision is a component of the first visual measurement data in a forward direction, y_dis_from_vision is a component of the first visual measurement data in a lateral direction, and z_dis_from_vision is a component of the first visual measurement data in a height direction, yaw_dis_from_vision is a component of the first visual measurement data in a yaw direction, x_dis is a component of the second visual measurement data in the forward direction, and y_dis is a component of the second visual measurement data in the lateral direction, z_dis is a component of the second visual measurement data in the height direction, yaw_dis is a component of the second visual measurement data in the yaw direction, x_cam2foot is the distance from an installation position of the visual sensor to a toe position of a supporting leg in the forward direction, y_cam2foot is the offset of a position of a center of mass of the robot, and z_cam2foot is the distance from the installation position of the visual sensor to the toe position of the supporting leg in the height direction.

* * * * *